(12) United States Patent
Raz (10) Patent No.: US 10,996,049 B2
(45) Date of Patent: May 4, 2021

(54) METHOD AND SYSTEM FOR ADJUSTING LIGHT PATTERN FOR STRUCTURED LIGHT IMAGING

(71) Applicant: Facebook Technologies, LLC, Menlo Park, CA (US)

(72) Inventor: Guy Raz, Binyamina (IL)

(73) Assignee: Facebook Technologies, LLC, Menlo Park, CA (US)

( * ) Notice: Subject to any disclaimer, the term of this patent is extended or adjusted under 35 U.S.C. 154(b) by 50 days.

(21) Appl. No.: 16/432,686

(22) Filed: Jun. 5, 2019

(65) Prior Publication Data

US 2019/0285405 A1   Sep. 19, 2019

Related U.S. Application Data

(63) Continuation of application No. 15/324,200, filed as application No. PCT/IL2015/050703 on Jul. 7, 2015, now Pat. No. 10,408,605.
(Continued)

(51) Int. Cl.
*G01B 11/00* (2006.01)
*G01B 11/25* (2006.01)
(Continued)

(52) U.S. Cl.
CPC .......... *G01B 11/2513* (2013.01); *G01B 11/22* (2013.01); *G01S 17/89* (2013.01); *G06T 7/521* (2017.01); *G06T 2207/10028* (2013.01)

(58) Field of Classification Search
CPC ..... G06T 17/00; G01B 11/25; G01B 11/2518; G01B 11/254
(Continued)

(56) References Cited

U.S. PATENT DOCUMENTS

2004/0004585 A1   1/2004 Brown et al.
2008/0218821 A1*  9/2008 Dalgleish ............. G02B 26/123
                                                359/197.1
(Continued)

FOREIGN PATENT DOCUMENTS

CN   103053167 A   4/2013
CN   110360953 A   10/2019
(Continued)

OTHER PUBLICATIONS

The State Intellectual Property Office of People's Republic of China, Chinese Patent Application No. 201910659142.1, dated Sep. 2, 2020, 29 pages.
(Continued)

*Primary Examiner* — Kevin K Pyo
(74) *Attorney, Agent, or Firm* — Fenwick & West LLP (57) ABSTRACT

A system and a method for producing an adjustable light pattern are provided herein. The system may include: a transmitter configured to illuminate a scene with a patterned light being adjusted based on predefined criteria; a receiver configured to receive reflections of the adjusted patterned light; and a computer processor configured to control the adjustment of the patterned light and further analyze the received reflections, to yield a depth map of objects within the scene, wherein the transmitter may include: a light source configured to produce a light beam; a first reflector tiltable approximately along a line on an x-y plane in a Cartesian x-y-z coordinate system; and a second reflector tiltable along a z-axis in said coordinate system, wherein the reflectors are tilted along their respective axes back and forth so as to divert the light beam for creating the adjusted patterned light.

20 Claims, 6 Drawing Sheets

Related U.S. Application Data (60) Provisional application No. 62/021,942, filed on Jul. 8, 2014.

(51) Int. Cl.
| | | |
|---|---|---|
| *G01S 17/89* | (2020.01) | |
| *G06T 7/521* | (2017.01) | |
| *G01B 11/22* | (2006.01) | |

(58) Field of Classification Search
USPC .................. 250/221; 345/420; 356/603, 610
See application file for complete search history.

(56) References Cited

U.S. PATENT DOCUMENTS

| | | | |
|---|---|---|---|
| 2010/0118123 A1 | 5/2010 | Freedman et al. | |
| 2011/0188054 A1 | 8/2011 | Petronius et al. | |
| 2011/0227915 A1 | 9/2011 | Mandella et al. | |
| 2011/0313721 A1* | 12/2011 | Keshavmurthy .. | G01B 11/2509 702/156 |
| 2013/0127854 A1 | 5/2013 | Shpunt et al. | |
| 2016/0006914 A1* | 1/2016 | Neumann ............. | G01S 7/4817 348/78 |
| 2017/0164836 A1 | 6/2017 | Krishnaswamy et al. | |

FOREIGN PATENT DOCUMENTS

| | | |
|---|---|---|
| JP | 2000-036085 | 2/2000 |
| JP | 2013-257166 | 12/2013 |
| WO | WO 2006/085834 A1 | 8/2006 |
| WO | WO 2014/014838 A2 | 1/2014 |
| WO | WO 2015/120020 A1 | 8/2015 |

OTHER PUBLICATIONS

Australian Government, IP Australia, Examination Report No. 1 for standard patent application, Australian Patent Application No. 2015287252, dated Sep. 12, 2018, 4 pages.

Canadian Intellectual Property Office, Office Action, Canadian Patent Application No. 2,954,430, dated Jan. 2, 2018, three pages.

European Patent Office, Office Action, European Patent No. 15 818 733.6, dated Nov. 22, 2018, eight pages.

European Patent Office, Extended European Search Report and Opinion, EP Patent Application No. 15818733.6, dated Dec. 12, 2017, eight pages.

Hoy, C. et al., "Fast-updating and nonrepeating Lissajous image reconstruction method for capturing increased dynamic information," Applied Optics, Jun. 1, 2011, vol. 50, No. 16, pp. 2376-2382.

Japan Patent Office, Japanese Office Action, Japanese Patent Application No. 2017-500820, dated Mar. 15, 2019, 10 pages.

Mexican Institute of Industrial Property, Division of Patents, Mexican Patent Appl. No. MX/a/2017/000193, Nov. 6, 2018 [with summary in English].

National Intellectual Property Administration of China, Office Action, Chinese Patent No. 201580048237.X, dated Nov. 21, 2018, 22 pages.

PCT International Search Report and Written Opinion, PCT/IL2015/050703, dated Dec. 29, 2015, 10 Pages.

* cited by examiner

910 — OBTAINING PATTERN ADJUSTMENT PARAMETERS

920 — ILLUMINATING A SCENE WITH THE ADJUSTED PATTERN

930 — DETECTING REFLECTIONS OF THE ADJUSTED PATTERN

940 — ANALYZING THE REFLECTIONS TO YIELD A DEPTH MAP

METHOD AND SYSTEM FOR ADJUSTING LIGHT PATTERN FOR STRUCTURED LIGHT IMAGING

CROSS REFERENCE TO RELATED APPLICATIONS

This application is a continuation of U.S. application Ser. No. 15/324,200, filed Jan. 5, 2017, which is a 371 National Phase filing of PCT/IL/2015/050703, filed Jul. 7, 2015, which claims the benefit of U.S. Provisional Application No. 62/021,942, filed Jul. 8, 2014, each of which is incorporated by reference in its entirety.

TECHNICAL FIELD

The present invention relates generally to structured light, and more particularly, to adjusting light pattern in a structured light system.

BACKGROUND OF THE INVENTION

Prior to setting forth the background of the invention, it may be helpful to set forth definitions of certain terms that will be used hereinafter.

The term "structured light" as used herein is defined as the process of projecting a known pattern of pixels (e.g. grids or horizontal bars) on to a scene. The projected patterned light is deformed when striking surfaces and analyzing the deformation allows vision systems to calculate the depth and surface information of the objects in the scene. For providing further details of how structured light can be implemented, by way of illustration only, WIPO publication number WO2013088442 is incorporated herein by reference in its entirety.

Figure 1A:
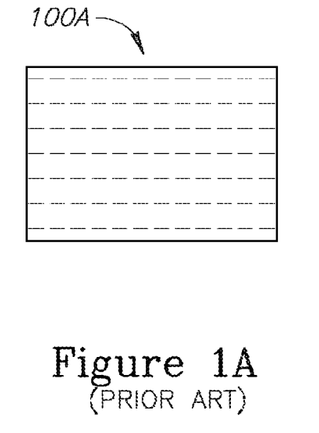
FIGS. 1A and 1B are schematic diagrams illustrating several known structured light techniques according to the prior art.

The term "spatial coding" as used herein is defined as a fixed pattern that is projected onto the scene and is imaged by the sensor's camera. The fixed pattern is designed in such a way that along epipolar lines each region of the pattern can be uniquely identify by considering the local neighborhood pattern. This method is efficient in terms of projected pattern power use and acquisition time, but requires dedication of several pixels to each label and hence results in lower spatial resolution. The main disadvantage is that a fixed pattern lacks the flexibility to respond to different scene conditions by using a different pattern. FIG. 1A illustrates a fixed light pattern 100A exhibiting broken lines according to the prior art. The fixed pattern may be implemented using a mask of phase shifters configured to result in combination of constructive and destructive interferences.

Figure 1B:
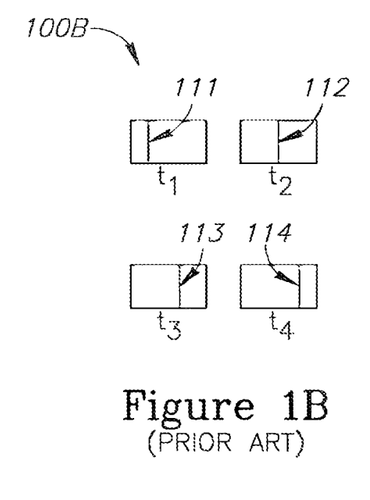

The term "temporal coding" as used herein is defined as illuminating the scene by a series of patterns. The patterns series are designed in such a way that each pattern position in a particular epipolar line is coded by a unique time series. The method can be accurate and has flexibility, but is not power efficient and requires a long acquisition time. FIG. 1B illustrates a temporal light pattern 100B according to the prior art, exhibiting a unique vertical line 111, 112, 113, and 114 for each of time stamps $t_1$, $t_2$, $t_3$, and $t_4$ respectively.

While the ability to dynamically change the pattern is highly desired, the power inefficiency it ensued makes it very unattractive in many applications. In order to allow a dynamic pattern, typically an image source is used. Such an image source either scans the scene progressively or illuminates it simultaneously, with the image forming light source modulated to produce the light and dark areas of the pattern. Considering the maximal output of the light source, its modulation reduces the "on" time and hence reduces the total output power.

Taking, as an example, a constant wave (CW) laser diode as the light source projected using a scanning mirror system. Such a laser diode may emit a certain amount of maximal optical power. When the light is modulated in order to produce the desired pattern, the average intensity is reduced by the modulation and hence a loss of brightness results. This tradeoff is true for any standard use of image projection method.

SUMMARY OF THE INVENTION

Some embodiments of the present invention overcome the aforementioned disadvantages of the fixed patterned light, namely lack of flexibility, and the disadvantages of the temporal coding being low energetic efficiency, and a longer acquisition time of the scene.

Embodiments of the present invention provide a system for adjusting light patterns for structured light imaging devices. The system may include: a transmitter configured to illuminate a scene with a patterned light being adjusted based on predefined criteria; a receiver configured to receive reflections of the adjusted patterned light; and a computer processor configured to control the adjustment of the patterned light and further analyze the received reflections, to yield a depth map of objects within the scene, wherein the transmitter may include: a light source configured to produce a light beam; a first reflector tiltable approximately along a −45° line on an x-y plane in a Cartesian x-y-z coordinate system; and a second reflector tiltable along a z-axis in said coordinate system, wherein the reflectors are tilted along their respective axes back and forth so as to divert the light beam for creating the adjusted patterned light.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before explaining at least one embodiment of the present technique in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. Such apparatuses may be specially constructed for the desired purposes, or may comprise controllers, computers or processors selectively activated or reconfigured by a computer program stored in the computers. Such computer programs may be stored in a computer readable storage medium (e.g., a non-transitory computer readable storage medium), such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. It will be appreciated that a variety of programming languages may be used to implement the teachings of the invention as described herein.

Embodiments of the invention may include an article such as a computer or processor readable medium, or a computer or processor storage medium, such as for example a memory, a disk drive, or a USB flash memory, encoding, including or storing instructions, e.g., computer-executable instructions that, when executed by a processor or controller, carry out methods disclosed herein. Processors may include any standard data processor, such as a microprocessor, multiprocessor, accelerator board, or any other serial or parallel high performance data processor. Embodiments of the invention may be included as part of a computing system, such as, for example, a personal computer or workstation which includes standard components such as an operating system, a processor, a memory, a disk drive, and input-output devices. Embodiments of the present invention may be compatible or integrated with any operating system on any device including, without limitation, the OSX operating system or WINDOWS® operating system. Alternative computer configurations are possible, and the system and method of the present invention may be implemented on various suitable computing systems, including, without limitation, hand-held, mountable or mobile computing systems.

Figure 2:
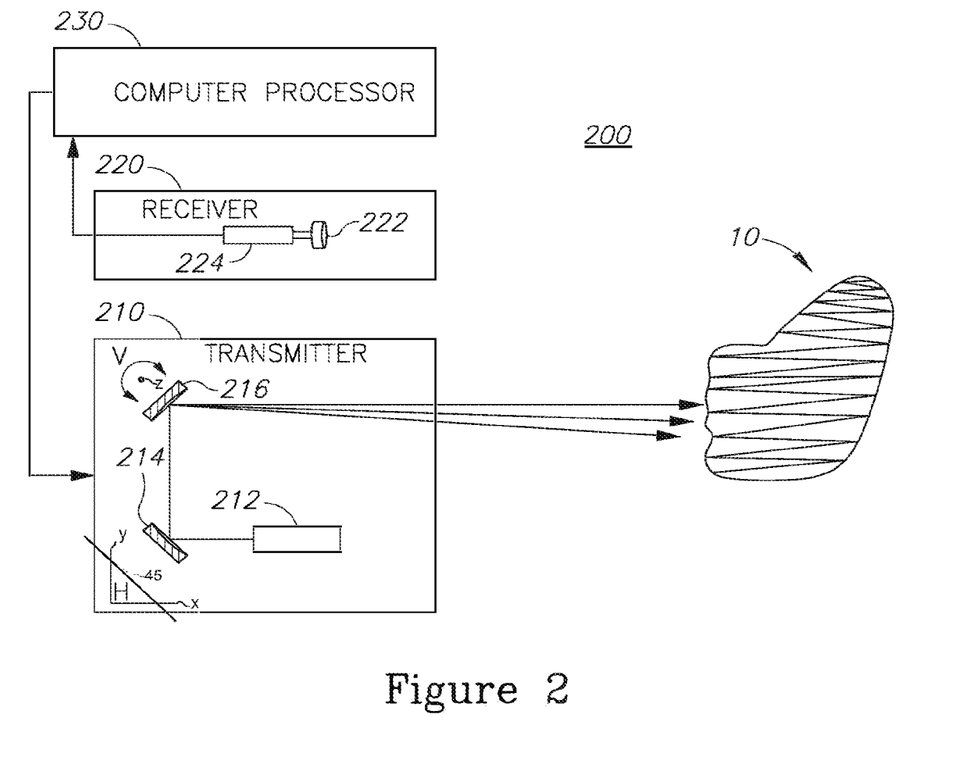
FIG. 2 is a schematic block diagram illustrating a system according to embodiments of the present invention.

FIG. 2 is a schematic block diagram illustrating a system 200 according to embodiments of the present invention. System 200 may be implemented by a combination of hardware and software and is configured to generate and analyze an adjustable light pattern wherein the adjustable pattern is usable for spatial coding of structured light. System 200 may include a transmitter 210, a receiver 220 and a computer processor 230.

Transmitter 210 (shown in an x-y-z Cartesian coordinate system with X-axis directed to the right, y-axis directed upwards, and z-axis directed into the page) may include a light source 212 configured to generate a light beam (e.g., a laser) directed onto a first reflector 214 (e.g., a mirror) which is tiltable and controllable (e.g., by computer processor 230) so first reflector 214 may tilt around a first axis being approximately along the −45° line on the x-y plane in an x-y-z Cartesian coordinate system (e.g., horizontally, denoted H) in a periodic scanning movement (e.g., scanning back and forth, in a sinusoidal motion, a sector of a predefined angle) resulting in folding the light beam in a scanning back and forth movement. Similarly, transmitter 210 may further include a second reflector 216 (e.g., a mirror) which may be located along the optical path of the light after it has been folded by the first reflector 214. Second reflector 216 may also be both tiltable and controllable (e.g., by computer processor 230) in such a way that second reflector 216 may tilt over a second axis being a z-axis in the same x-y-z Cartesian coordinate system (e.g., vertically, denoted V) in a periodic scanning movement (e.g., scanning back and forth, in a sinusoidal motion, a sector of a predefined angle) wherein the tilt axis of second reflector 216 and the tilt axis of first reflector 214 are substantially perpendicular (e.g. between +10° and −10° relative to a perpendicular line crossing each of the aforementioned tilt axis). Thus, the light beam reaching second reflector 216 is folded again (e.g., onto a direction substantially parallel to the original direction of the light beam as it left light source 212). The synchronized tilting of both reflectors thus create the adjustable light pattern in the scene, whose boundaries can be adjusted and limited for one or more sector within the scene as will be detailed hereinafter. Furthermore, in accordance with embodiments of the present invention, the scanning speed of first reflector 214 and the scanning speed of the second reflector 216 exhibit a constant ratio therebetween (e.g., the ratio between the scanning speed of the horizontally scanning reflector and the scanning speed of the vertically scanning reflector is a rational number). In consequence, the patterned light generated by transmitter 210 and projected onto scene 10 provides a complex harmonic curve such as a closed Lissajous curve.

According to some embodiments of the present invention the ratio between the two scanning speeds (e.g., horizontal and vertical) is selected to generate a substantially jigsaw pattern over scene 10 which may be controlled over time in order to adjust the pattern to various factors which may change over time in the scene as will be explained in greater detail below.

According to some embodiments of the present invention, first and second reflectors 214 and 216 may be implemented as mirrors within a micro electro mechanic system (MEMS) having dimensions selected to allow the required beam distortion. The mirror driving can be electrostatic or magnetic or Piezoelectric or similar.

According to some embodiments of the present invention light source 212 may be a collimated single mode laser with a wavelength of approximately 830 nm. The collimation of the light may be achieved by a simple lens either refractive or diffractive.

Receiver 220 may include optics 222 through which the reflections of the light pattern from scene 10 are being collected and a sensor 224 possibly in the form of a complimentary metal oxide substrate (CMOS) matrix detector. Sensor 224 may be configured to detect the reflections in a refresh rate that is sufficient to sense dynamic changes in scene 10. Additionally, the rate needs to be adequate to enable observing in full the transmitted pattern which takes time to be drawn along its curve.

Computer processor 230 may execute computer readable code (e.g., a computer program or software) that may be configured to control the components of transmitter 210 and further to analyze the reflections of the patterned light coming from scene 10 as received and detected by receiver 220. Specifically, computer processor 230 may be configured to employ spatial coding techniques known in the art of structured light. To that end, the entire scan generating for example a closed Lissajous curve is attributed for at least one frame and the integration of sensor 224 is selected accordingly. For any given (known) pattern generated by transmitter 210, computer processor 230 may adjust its analysis to optimally implement spatial coding as if the pattern was a static one (e.g., transmitted simultaneously to cover a specified sector).

Advantageously, a pattern generated by transmitter 210 as explained above enable to tailor a pattern, for structured light imaging systems, based on dynamic characteristics of both the scene and/or the objects within it such as a scene, including an object located remotely from the transmitter (e.g., far field scenario) or alternatively where the object is located in proximity to the transmitter (e.g., near field scenario). Furthermore, embodiments of the present invention are enabled, where required, to use a maximal intensity of light source 212 irrespective of the pattern, provided it is a closed Lissajous curve. This may present an important advantage over scanning-generated light patterns, which require shutting down the light source at various time slots. The following explains in detail, several exemplary, illustrating non-limiting embodiments for adjusting the light pattern transmitted by transmitter 210 and their corresponding advantages and methods of use.

Figure 3:
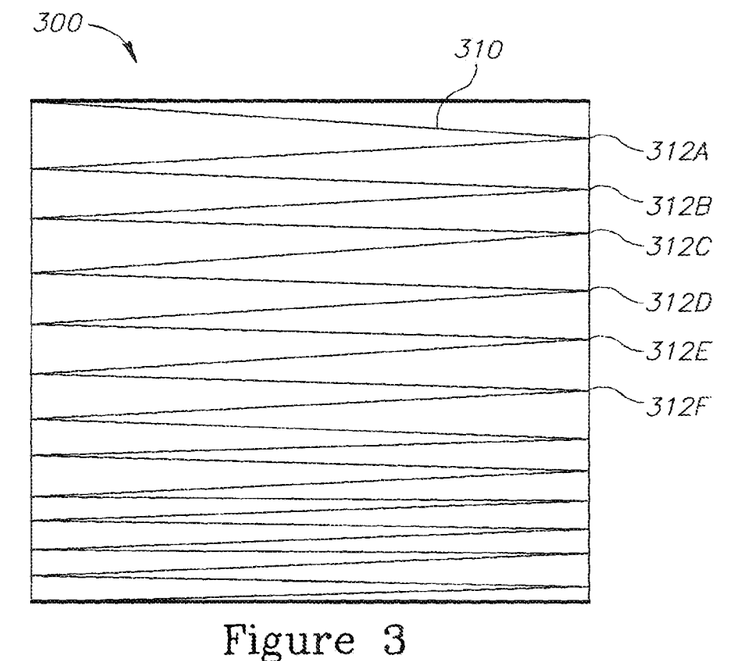
FIG. 3 is a schematic diagram illustrating an aspect of the adjustable pattern according to embodiments of the present invention.

FIG. 3 is a schematic diagram illustrating an aspect of an adjustable pattern according to embodiments of the present invention. Light pattern 300 may exhibit a distinctive jigsaw pattern (e.g., a closed Lissajous curve) where the light line 310 of a constant intensity runs back and forth (possibly at a 200 Hz refresh rate). As explained above, the ratio between the vertical scanning speed and the horizontal scanning speed is preferred to be a rational number so that in each cycle of scanning, pattern 300 remains identical. This is a prerequisite so that a spatial coding may be achieved. The ratio itself changes over time as will be explained below, but at all times it is preferred to reflect a rational number. At points where the reflectors (e.g., vertical and horizontal) change the direction of their scanning movements such as at jigsaw points 312A-312F and also at uppermost and lowermost lines of pattern 300, line 310 may be presented as thicker, but in general line 310 exhibits approximately constant intensity without unnecessary shutdowns of light source 212. It should be noted that the intensity may somewhat vary along the line due to the speed of the horizontal mirror. In order to generate a light pattern that is sufficiently dense (e.g., the distance between the lines at the jigsaw pattern relative to the covered area), a ratio between a horizontal axis and a vertical axis of approximately 1:10 and higher may be required. It should be noted that the aforementioned ratio dictates the number of lines, so 1:10 will give only 10 lines and usually more lines are required for practical application (e.g., 100 or more lines). The higher scanning speed is required along a stereoscopic axis (being the axis along which a stereoscopic image is created from two viewpoints), which is often the vertical axis in structured light applications using lines patterned light in which the objects to be tracked are vertically oriented, such as the head or the palm of the hand of a user. It is noted that the depth map that is extracted from the reflections of the pattern may be used for recognition of postures and gestures made by the hand of the user or any other body part in accordance with certain embodiments of the present application.

Figure 4:
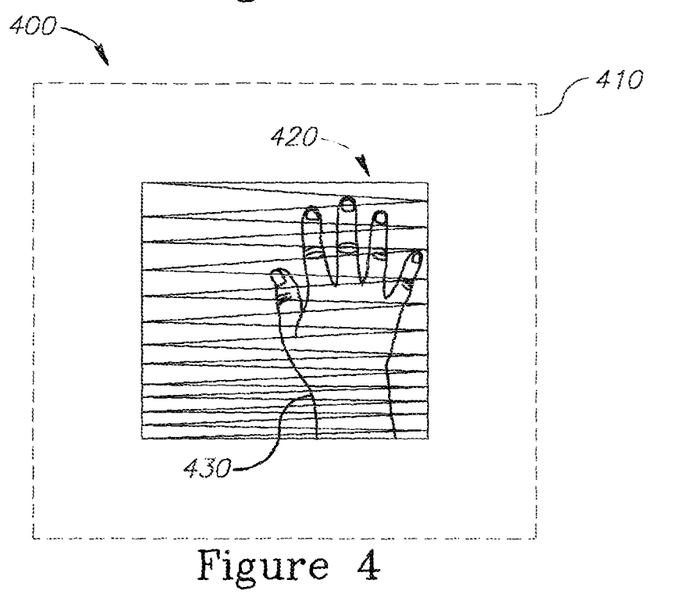
FIG. 4 is a schematic diagram illustrating another aspect of the adjustable pattern in accordance with embodiments according to the present invention.

FIG. 4 is a schematic diagram illustrating another aspect of the adjustable pattern in accordance with embodiments according to the present invention. Light pattern 400 illustrates dimensional adjustment in which the light pattern is concentrated at a region of interest 420 (ROI) being a subset of area 410 defining a potential coverage of the pattern 400 by the transmitter. The dimension adjustment of pattern 400 may be achieved by adjusting the span of the scan of each of the one or more reflectors so that they each cover a smaller sector. Limiting the scanning span of the reflectors may affect the ratio between vertical and horizontal scanning and therefore attention should be drawn to meeting the closed Lissajous curve requirements. Illuminating a ROI 420 may be useful for improving signal to noise ratio (SNR) and signal to background ratio by putting more light onto the desired region of interest. ROI illumination may also be useful whenever a specific object, such as a palm of a hand 430, requires higher illumination intensity or when other objects in the scene should not be illuminated at all.

Figure 5:
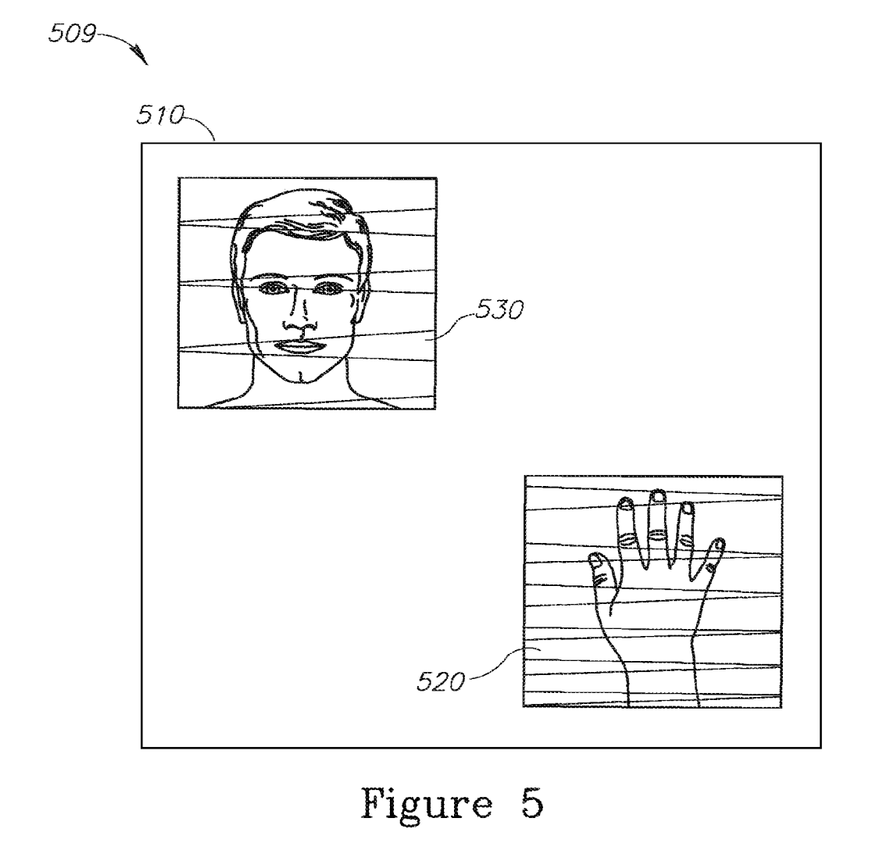
FIG. 5 is a schematic diagram illustrating yet another aspect of the adjustable pattern in accordance with embodiments according to the present invention.

FIG. 5 is a schematic diagram illustrating yet another aspect of an adjustable pattern in accordance with certain embodiments of the present invention. Light pattern 509 illustrates adjusting an original (maximal) area 510 into two (or more) ROIs—region 520 (directed at the palm of the hand) and region 530 directed at the head of the user. As opposed to the adjustment illustrated in FIG. 4 above, the dimensional adjustment here is carried out by shutting down the illumination beam at any pixel other than ROIs 520 and 530. This leads to some energetic inefficiency compared with the adjustment pattern illustrated in FIG. 4. However, the use of multiple ROIs may sometimes be needed according to the type of structured light application such as when simultaneous illumination of different objects at a single scan cycle.

Similarly, instead of shutting down the illumination source its intensity can be adjusted in order to overcome strong variations in the scene reflectivity. In such a way more reflective scene parts will be projected with lower intensity pattern in order to avoid saturation and increase the sensing dynamic range.

Figure 6:
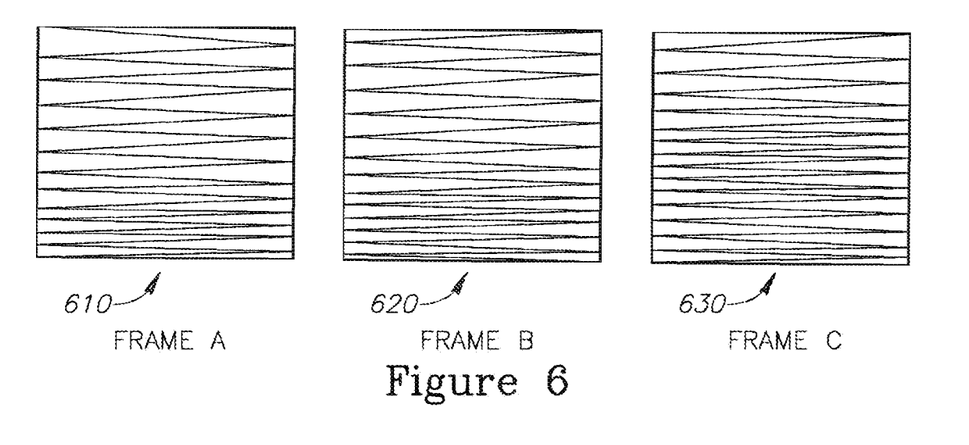
FIG. 6 is a schematic diagram illustrating yet another aspect of the adjustable pattern in accordance with embodiments according to the present invention.

FIG. 6 is a schematic diagram illustrating yet another aspect of the adjustable pattern in accordance with embodiments according to the present invention. Light patterns 610, 620 and 630 are similar except for a different vertical displacement from a common base line. In accordance with some embodiments, it would be possible to adjust the light pattern over time and present a different pattern for each frame (possibly periodically). Here, for instance, each of light patterns 610, 620 and 630 correspond with a series of Frame A, Frame B, and Frame C and so forth. The adjustment over time may be advantageous for obtaining a higher resolution from the multiple exposures. An example for that is shifting the pattern up by a fraction of the distance between lines, hence getting larger vertical lines resolution. Implementing multiple exposures requires a slow varying scene in order to be able to achieve multiple exposures. As in all other adjustments to the pattern generated by the transmitter, the receiver is provided with data relating to the adjustment applied to the pattern so the analysis, per adjusted pattern, still resembles a spatial coding as known in the art.

Figure 7A:
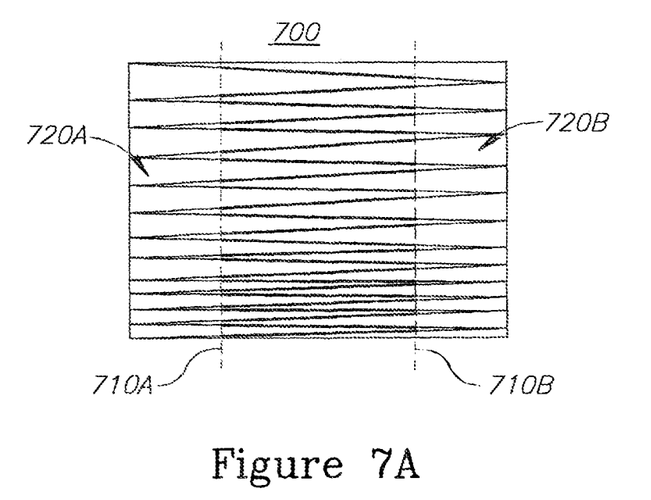
FIGS. 7A-7C are schematic diagrams illustrating an aspect of the system in accordance with embodiments according to the present invention.
Figure 7B:
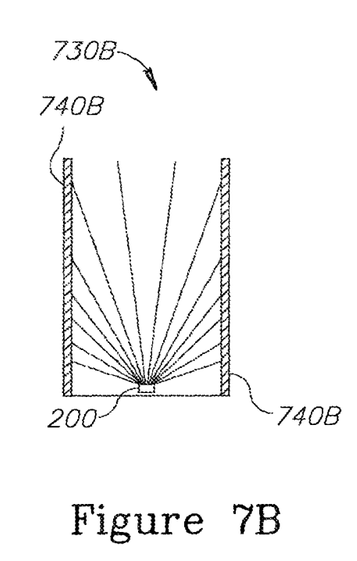
Figure 7C:
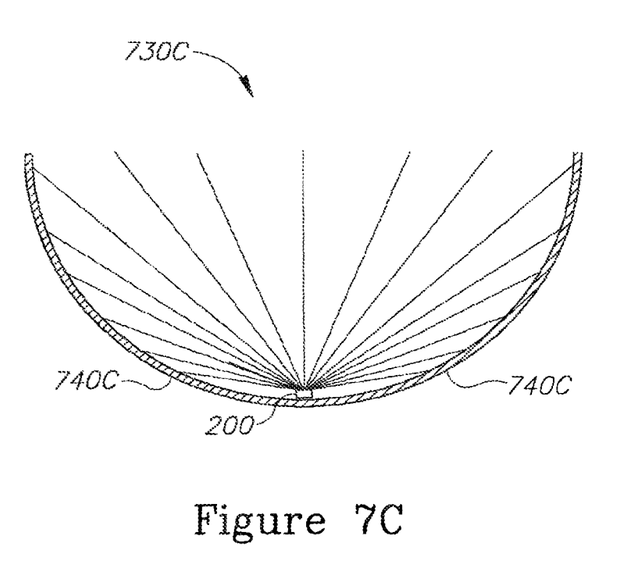

FIGS. 7A-7C are schematic diagrams illustrating an aspect of the system in accordance with certain embodiments of the present invention. FIG. 7B depicts a top view of a room 730B with a system 200 in accordance with embodiments of the present invention located near one of the walls. As illustrated, patterned light is transmitted from system 200 and some of it, particularly the light coining from the right side and the left side of system 200, hits walls 740B of room 730B. Due to the aforementioned geometry of room 730B it would be beneficial if the light pattern used, as shown in FIG. 7A and marked 700, exhibits variable intensity level with lower intensity lines 720A at the regions right of line 710B and left of line 710A. In other embodiments, the decrease in line intensity may be gradual and tailored per the geometry of the room. FIG. 7C illustrates an oval shaped room 730C with walls 740C in which a totally different pattern may be needed (possibly with more uniform intensity for the pattern line). Embodiments of the present invention will determined the geometry of the room and adjust the light pattern accordingly in order to improve the effectiveness of the structured light system.

Figure 8:
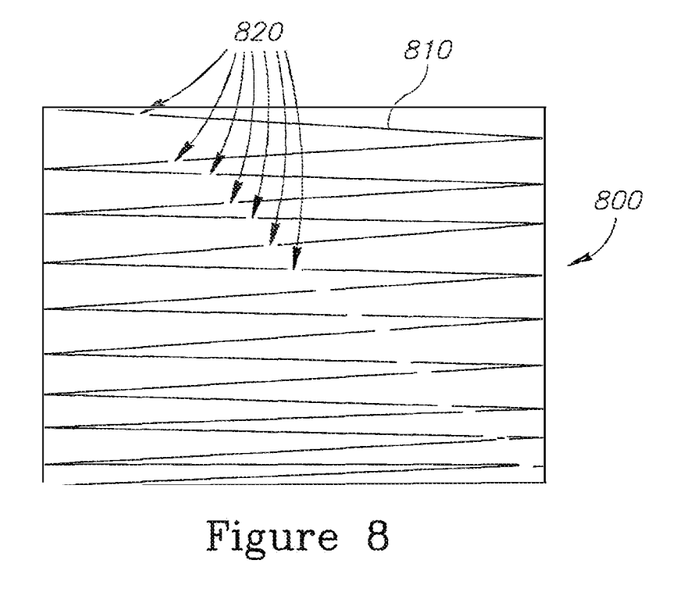
FIG. 8 is a diagram illustrating an aspect in accordance with embodiments according to the present invention.

FIG. 8 illustrates yet another aspect of the present invention. Pattern 800 exhibits one or more notches 820 (it should be noted that not all notches are indicated) along its line 810 wherein, for each horizontal line, the notches are positioned at a different location. This feature may serve for indexing the lines by enabling distinguishing between the specific lines at the receiver, based on the location of the notch. The notch may be any omission of light along a specified segment.

Figure 9:
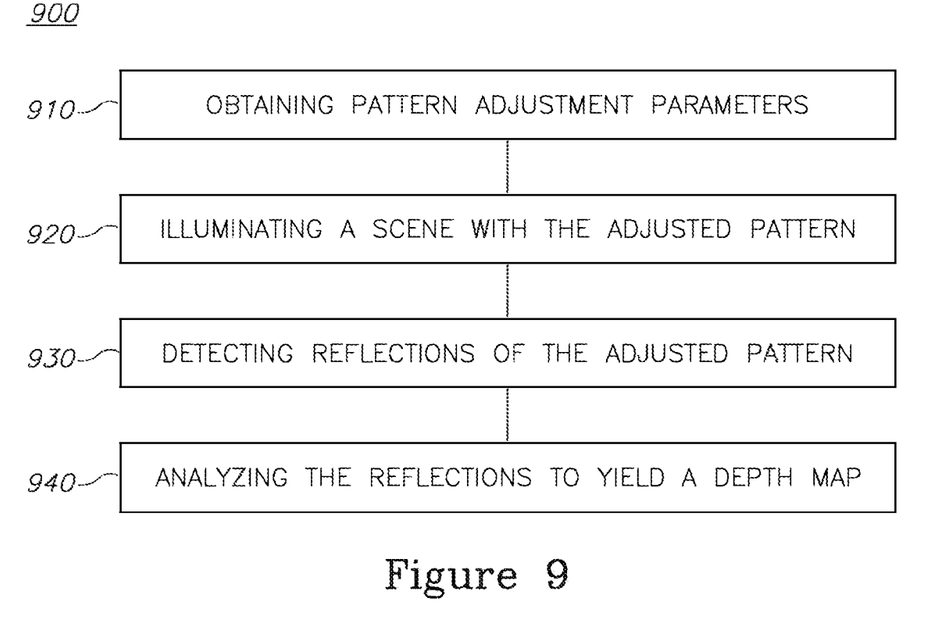
FIG. 9 is a high level flowchart illustrating a method in accordance with embodiments according to the present invention.

FIG. 9 is a high level flowchart illustrating a method in accordance with certain embodiments of the present invention. Method 900 includes obtaining pattern adjustment parameters 910. These can be user defined or automatically defined, and are tailored based on the application. The scene may then be illuminated with the adjusted pattern 920 and the reflections of the adjusted pattern are detected 930 where, in certain embodiments, the detection of the entire adjusted pattern is carried out in a single exposure per pattern. Additional exposures are contemplated. Finally, the reflections are analyzed for generating a depth map 940 in a way similar to other structured light methods.

Figure 10:
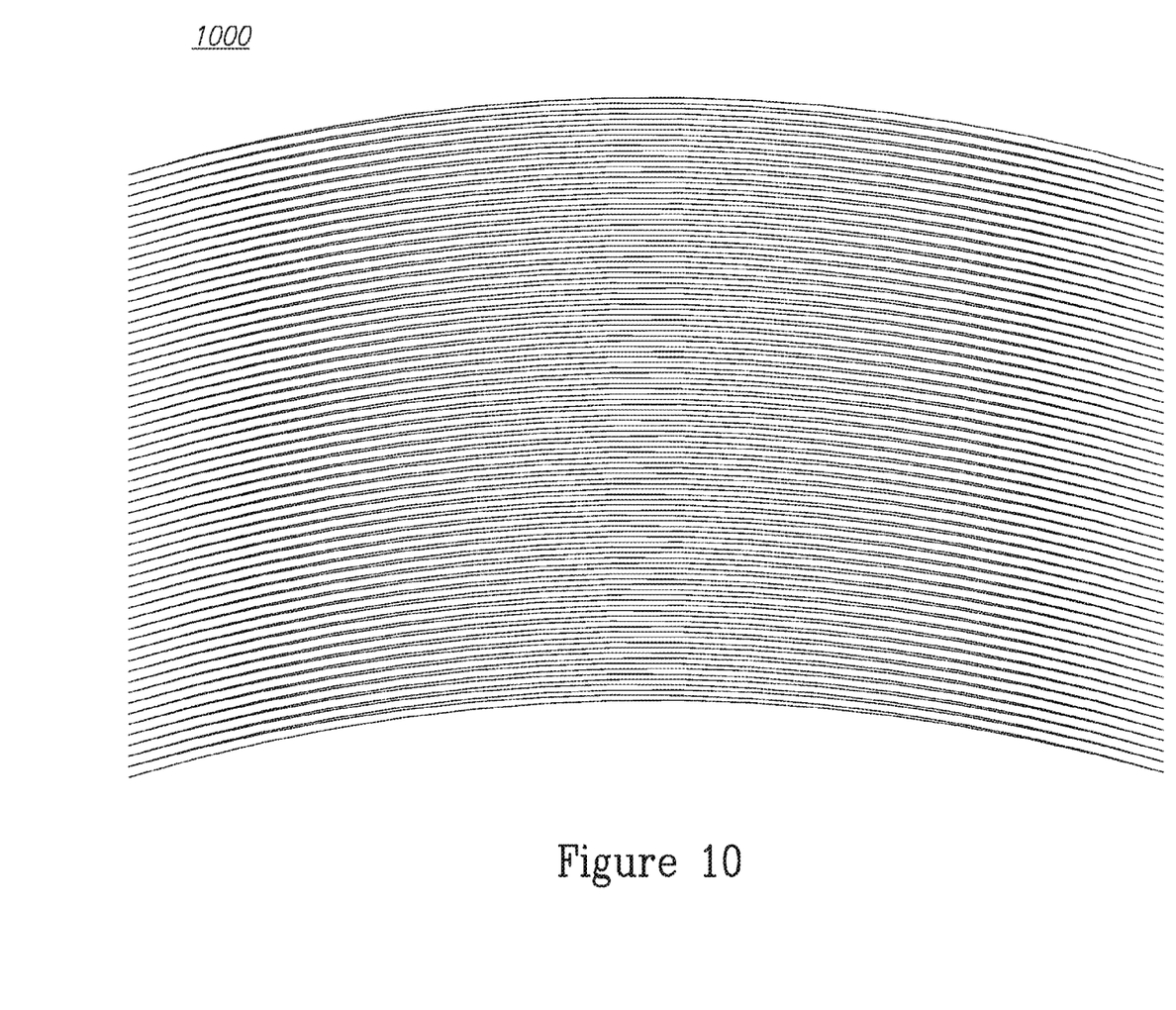
FIG. 10 is a real-life light pattern generated by a system in accordance with embodiments according to the present invention.

FIG. 10 is a real-life light pattern generated by a system in accordance with certain embodiments of the present invention. As can be seen in pattern 1000 a back and forth sinusoidal motion at a ratio of approximately 1:100 with the horizontal scan generates an approximation of a line pattern.

Advantageously, embodiments of the present invention serve as an efficient bridge between spatial and temporal structured light techniques. Embodiments present a momentarily fixed pattern which allows fast extraction of 3D data, but it can also modify the pattern to dynamically adapt it to changing scene conditions and requirements. The dynamic change can be devised to gradually enhance the information on the current scene or to optimize the data acquisition in terms of power, signal to noise ratio, and coping with background.

Advantageously, embodiments of the present invention present an efficient way to produce a pattern allowing utilization of the available light source to its maximal potential without requiring ineffective "off" time unnecessarily.

Thus, methods according to certain embodiments of the present invention overcome the main drawback of temporal structure light techniques by using a pattern that is fully light "on" based, and overcome the main drawback of spatial structured light techniques, which is the rigidity of the pattern that cannot be adapted to varying conditions.

In the above description, an embodiment is an example or implementation of the inventions. The various appearances of "one embodiment," "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment", "certain embodiments" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purposes only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising". "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention should not be considered as limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A transmitter comprising:
   a light source configured to produce a continuous light beam of patterned light, the patterned light having a pattern, of a plurality of patterns, wherein the continuous light beam is configured to operate at a maximum intensity irrespective of which pattern of the plurality of patterns is used to produce the patterned light;
   a first reflector tiltable on an x-y plane in a Cartesian x-y-z coordinate system; and
   a second reflector tiltable along a z-axis in said Cartesian x-y-z coordinate system,
   wherein the first reflector and the second reflector are configured to be tilted along their respective axes so as to divert the continuous light beam for creating the patterned light.

2. The transmitter according to claim 1, wherein the plurality of patterns follow a closed Lissajous curve.

3. The transmitter according to claim 2, wherein the closed Lissajous curve occurs when a ratio between a scanning speed of the first reflector and a scanning speed of the second reflector is a rational number.

4. The transmitter according to claim 1, wherein the patterned light is adjusted by limiting a scan of the first reflector and the second reflector to a limited sector within a specified sector.

5. The system according to claim 1, wherein a number of lines in the patterned light is changed by controlling a relative frequency with a computer processor.

6. The system according to claim 1, wherein the first reflector is tiltable approximately along a 45° line on the x-y plane.

7. The system according to claim 1, wherein the first reflector and the second reflector are tiltable back and forth along their respective axes.

8. A method comprising:
   producing a continuous light beam of patterned light, the patterned light having a pattern, of a plurality of patterns, wherein the continuous light beam is configured to operate at a maximum intensity irrespective of which pattern of the plurality of patterns is emitted as the patterned light;
   tilting a first reflector on an x-y plane in a Cartesian x-y-z coordinate system; and
   tilting a second reflector along a z-axis in said Cartesian x-y-z coordinate system, wherein the first reflector and the second reflector are configured to be tilted along their respective axes so as to divert the continuous light beam for creating the patterned light.

9. The method according to claim 8, wherein the plurality of patterns follow a closed Lissajous curve.

10. The method according to claim 9, wherein the closed Lissajous curve occurs when a ratio between a scanning speed of the first reflector and a scanning speed of the second reflector is a rational number.

11. The method according to claim 8, wherein the patterned light is adjusted by limiting a scan of the first reflector and the second reflector to a limited sector within a specified sector.

12. The method according to claim 8, wherein a number of lines in the patterned light is changed by controlling a relative frequency with a computer processor.

13. The method according to claim 8, wherein the first reflector is tiltable approximately along a 45° line on the x-y plane.

14. The method according to claim 8, wherein the first and the second reflector reflector are tiltable back and forth along their respective axes.

15. A computer program product comprising a non-transitory computer readable storage medium having instructions encoded thereon that, when executed by a processor, cause the processor to:
   produce a continuous light beam of patterned light, the patterned light having a pattern, of a plurality of patterns, wherein the continuous light beam is configured to operate at a maximum intensity irrespective of which pattern of the plurality of patterns is emitted as the patterned light;
   tilt a first reflector on an x-y plane in a Cartesian x-y-z coordinate system; and
   tilt a second reflector along a z-axis in said Cartesian x-y-z coordinate system, wherein the first reflector and the second reflector are configured to be tilted along their respective axes so as to divert the continuous light beam for creating the patterned light.

16. The computer program product according to claim 15, wherein the plurality of patterns follow a closed Lissajous curve.

17. The computer program product according to claim 15, wherein the patterned light is adjusted by limiting a scan of the first reflector and the second reflector to a limited sector within a specified sector.

18. The computer program product according to claim 15, wherein a number of lines in the patterned light is changed by controlling a relative frequency with a computer processor.

19. The computer program product according to claim 15, wherein the first reflector is tiltable approximately along a 45° line on the x-y plane.

20. The computer program product according to claim 15, wherein the first reflector and the second reflector are tiltable back and forth along their respective axes.

\* \* \* \* \*

UNITED STATES PATENT AND TRADEMARK OFFICE
CERTIFICATE OF CORRECTION

PATENT NO. : 10,996,049 B2  
APPLICATION NO. : 16/432686  
DATED : May 4, 2021  
INVENTOR(S) : Guy Raz

Page 1 of 1

It is certified that error appears in the above-identified patent and that said Letters Patent is hereby corrected as shown below:

In the Claims

In Column 10, Claim 5, Line 1, delete "system" and insert -- transmitter --, therefor.

In Column 10, Claim 6, Line 4, delete "system" and insert -- transmitter --, therefor.

In Column 10, Claim 7, Line 7, delete "system" and insert -- transmitter --, therefor.

In Column 10, Claim 14, Lines 41-42, delete "the first and the second reflector reflector" and insert -- the first reflector and the second reflector --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*